(12) United States Patent
Nitschke et al.

(10) Patent No.: US 10,683,227 B2
(45) Date of Patent: Jun. 16, 2020

(54) GLASS SHEET MOLD APPARATUS AND METHOD

(71) Applicant: GLASSTECH, INC., Perrysburg, OH (US)

(72) Inventors: David B. Nitschke, Perrysburg, OH (US); Dean M. Nitschke, Maumee, OH (US); James P. Schnabel, Jr., Holland, OH (US)

(73) Assignee: GLASSTECH, INC., Perrysburg, OH (US)

( * ) Notice: Subject to any disclaimer, the term of this patent is extended or adjusted under 35 U.S.C. 154(b) by 222 days.

(21) Appl. No.: 15/772,878

(22) PCT Filed: Nov. 2, 2016

(86) PCT No.: PCT/US2016/059992
§ 371 (c)(1),
(2) Date: May 2, 2018

(87) PCT Pub. No.: WO2017/079200
PCT Pub. Date: May 11, 2017

(65) Prior Publication Data
US 2018/0319697 A1   Nov. 8, 2018

Related U.S. Application Data

(60) Provisional application No. 62/249,661, filed on Nov. 2, 2015.

(51) Int. Cl.
*C03B 23/03* (2006.01)
*C03B 35/14* (2006.01)
(Continued)

(52) U.S. Cl.
CPC .......... *C03B 23/0302* (2013.01); *C03B 23/03* (2013.01); *C03B 23/0357* (2013.01);
(Continued)

(58) Field of Classification Search
CPC . C03B 23/0302; C03B 23/03; C03B 23/0357; C03B 35/145; C03B 35/24; C03B 2225/02
See application file for complete search history.

(56) References Cited

U.S. PATENT DOCUMENTS

| 4,260,409 A | 4/1981 | Reese et al. |
| 4,872,898 A | 10/1989 | Enk et al. |

(Continued)

FOREIGN PATENT DOCUMENTS

| RU | 2 092 460 C1 | 10/1997 |
| RU | 2 350 572 C2 | 3/2009 |
| RU | 150 444 U1 | 2/2015 |

OTHER PUBLICATIONS

Extended Extended European Search Report dated Oct. 9, 2019, Application No. 16862823.8, 5 Pages.
(Continued)

*Primary Examiner* — Queenie S Dehghan
(74) *Attorney, Agent, or Firm* — Brooks Kushman P.C.

(57) ABSTRACT

A mold apparatus for bending a glass sheet includes a main frame structure and a first mold arrangement having a first mold and a guide frame connected to the first mold. A first guide member of the guide frame is guidable by the frame structure such that it is inhibited from moving laterally in any direction, and a second guide member of the guide frame is guidable by the frame structure such that it is movable laterally away from the first guide member due to thermal expansion. The apparatus further includes a second mold arrangement including a second mold and a frame that supports the second mold such that the second mold is movable laterally relative to the frame. A sensor is also included for sensing position of one of the molds to determine whether the one mold is in a suitable position for mating with the other mold.

26 Claims, 7 Drawing Sheets

(51) Int. Cl.
*C03B 23/035* (2006.01)
*C03B 35/24* (2006.01)

(52) U.S. Cl.
CPC ............ *C03B 35/145* (2013.01); *C03B 35/24* (2013.01); *C03B 2225/02* (2013.01)

(56) References Cited

U.S. PATENT DOCUMENTS

| | | | |
|---|---|---|---|
| 4,883,526 A | 11/1989 | Enk et al. | |
| 5,286,271 A | 2/1994 | Rueter et al. | |
| 5,320,661 A | 6/1994 | Fecik et al. | |
| 5,743,931 A | 4/1998 | Flaugher et al. | |
| 6,038,887 A * | 3/2000 | Vild | C03B 23/0252 425/436 R |
| 6,729,160 B1 | 5/2004 | Nitschke et al. | |
| 6,904,771 B2 | 6/2005 | Moulding et al. | |
| 2004/0226318 A1 | 11/2004 | Schwartz et al. | |

OTHER PUBLICATIONS

PCT Notification of Transmittal of the International Search Report and the Written Opinion of the International Searching Authority dated Dec. 29, 2016, Application No. PCT/US2016/059992, Applicant Glasstech, Inc., 11 Pages.

PCT Internatinal Preliminary Report on Patentability dated May 8, 2018, Application No. PCT/US2016/059992, Applicant Glasstech, Inc., 8 Pages.

Russian Acceptance Decision & Search Report dated Feb. 25, 2020, Application No. 2018119169/03, Applicant Glasstech, Inc. with Partial English Translation (21 Pages Total).

Brazilian Preliminary Examination Report dated Mar. 25, 2020 (with English Machine Translation), Application No. BR112018008798-0, Applicant Glasstech, Inc., (9 Pages Total).

\* cited by examiner

GLASS SHEET MOLD APPARATUS AND METHOD

CROSS-REFERENCE TO RELATED APPLICATIONS

This application is the U.S. national phase of PCT Application No. PCT/US2016/059992 filed on Nov. 2, 2016, which claims the benefit of U.S. provisional patent application Ser. No. 62/249,661, filed on Nov. 2, 2015, the disclosures of which are incorporated in their entirety by reference herein.

TECHNICAL FIELD

The present disclosure relates to apparatuses and methods for molding glass sheets.

BACKGROUND

Prior apparatuses for molding glass sheets are disclosed in U.S. Pat. Nos. 6,032,491 and 6,729,160, for example.

SUMMARY

A mold apparatus, according to the present disclosure, for bending a glass sheet includes a main frame structure and a first mold arrangement supported by the main frame structure. The first mold arrangement includes a first mold and a guide frame connected to the first mold, and the guide frame includes first and second guide members that are vertically movable with respect to the main frame structure. The first guide member is guidable by the main frame structure such that the first guide member is inhibited from moving laterally in any direction when a portion of the first mold arrangement including the first mold is subjected to heat, and the second guide member is guidable by the main frame structure such that the second guide member may move laterally away from the first guide member due to thermal expansion of the first mold arrangement. The mold apparatus further includes a second mold arrangement including a second mold and a support frame that supports the second mold such that the second mold is movable laterally with respect to the support frame. In addition, the mold apparatus includes at least one sensor for sensing position of one of the molds in order to determine whether the one mold is in a suitable position for mating with the other mold. Furthermore, the second mold is adjustable laterally to mate with the first mold in order to account for thermal expansion that may occur during use.

A method, according to the disclosure, of operating a mold apparatus for bending a glass sheet is also provided. The mold apparatus includes a main frame structure, a first mold arrangement supported by the main frame structure and including a vertically movable first mold and a guide frame connected to the first mold, and a second mold arrangement including a second mold and a support frame that supports the second mold. The method includes sensing position of one of the molds in order to determine whether the one mold is in a suitable position for sufficiently mating with the other mold when the molds are subjected to heat. If determined that the molds will not sufficiently mate based on the sensed position of the one mold, the method further includes adjusting the second mold laterally with respect to the support frame so that the second mold will sufficiently mate with the first mold, or providing an indication that the molds will not sufficiently mate. Furthermore, the guide frame of the first mold arrangement includes first and second guide members that are vertically movable with respect to the main frame structure, the first guide member is guidable by the main frame structure such that the first guide member is inhibited from moving laterally in any direction when a portion of the first mold arrangement including the first mold is subjected to heat, and the second guide member is guidable by the main frame structure such that the second guide member may move laterally away from the first guide member due to thermal expansion of the first mold arrangement.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein. It is to be understood, however, that the disclosed embodiments are merely exemplary and that various and alternative forms are possible. Furthermore, the figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, as those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without one or more of the specific features explained in the following description.

During manufacture of a glass sheet product, such as a glass mirror panel for a solar power collection application, a vehicle windshield, rear window, or any other suitable product, it may be desirable to form or bend a sheet of glass in a mold apparatus at a bending station. Due to temperature changes at the bending station, however, movement of associated mold tools may occur such that the mold tools are not able to properly mate. In the present disclosure, apparatuses and methods that address mold tool movement are provided to improve glass processing.

Figure 1:
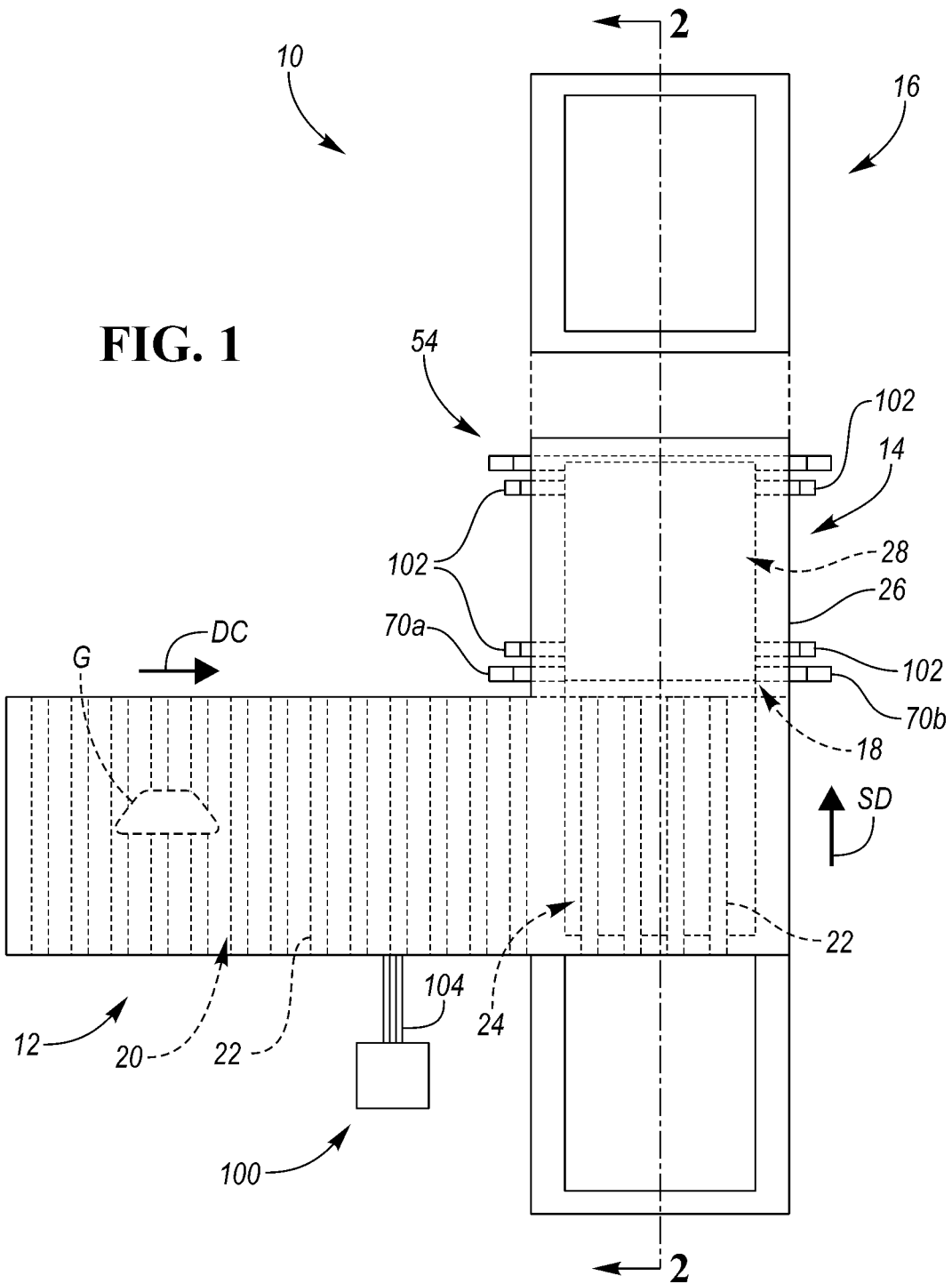
FIG. 1 is a schematic top view of a glass processing system including a mold apparatus according to the present disclosure.
Figure 2:
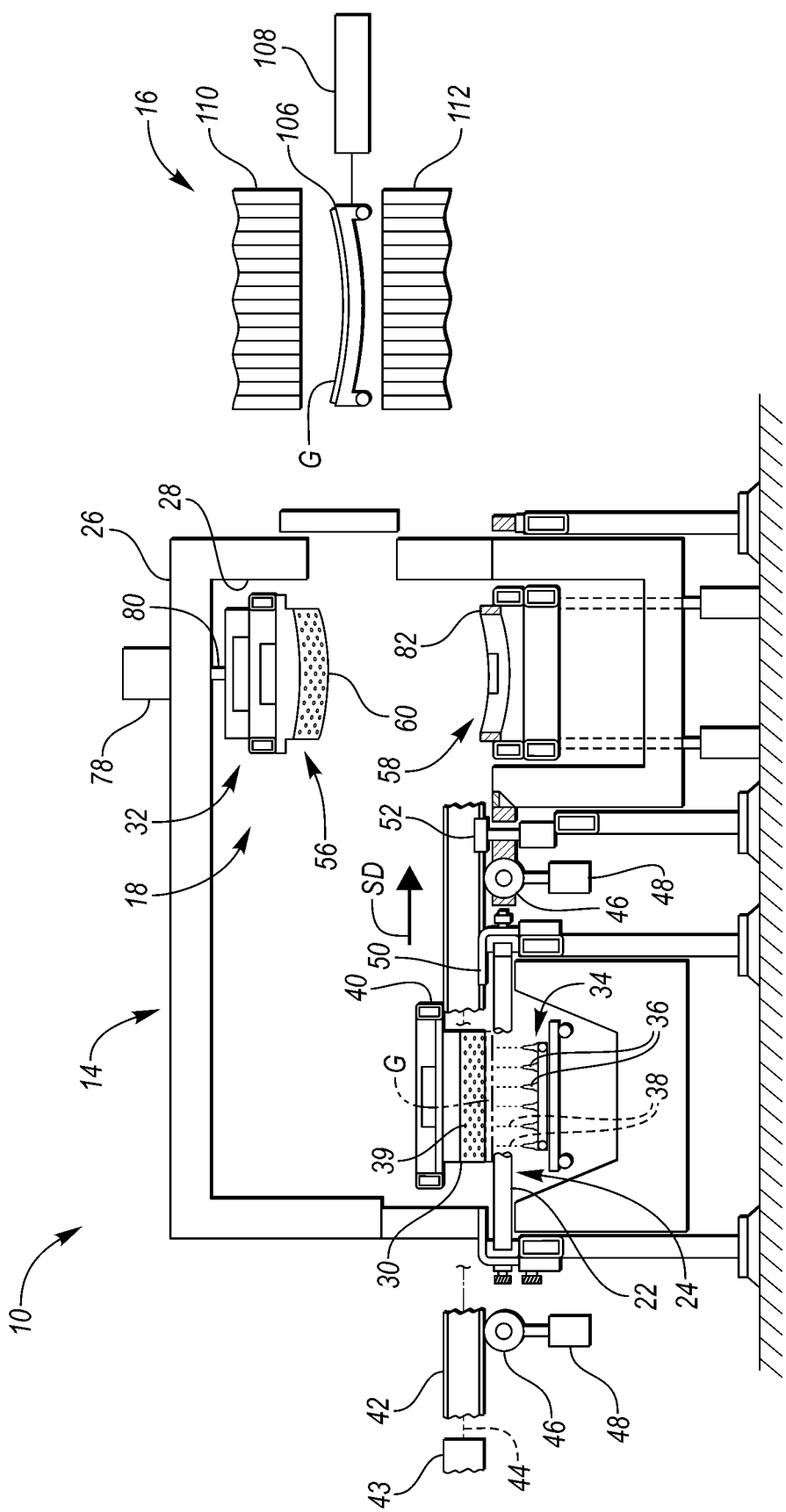
FIG. 2 is a schematic cross-sectional view of the system of FIG. 1 taken along line 2-2 in FIG. 1 and showing the mold apparatus, which includes a press mold portion partially surrounded by a housing.

Referring to FIGS. 1 and 2, a glass processing system 10 is shown for processing glass sheets G. The system 10 includes a heating apparatus or station, such as a furnace 12, for heating the glass sheets G; a forming or bending station 14 for forming or bending each glass sheet G into a desired shape; and a cooling station 16, such as an annealing station or a quench station, configured to cool each glass sheet G. In the embodiment shown in FIGS. 1 and 2, the bending station 14 includes a glass sheet bending apparatus or mold apparatus 18, according to the present disclosure, for molding or bending glass sheets G and that is configured to accommodate or otherwise address mold tool movement due to thermal factors, as explained below in detail.

The furnace 12 may have any suitable configuration for heating the glass sheets G. For example, the furnace 12 may include any suitable heating elements (not shown) positioned above and/or below a conveyor or conveyor system 20, which may be used to convey the glass sheets G in a generally horizontally extending orientation along a plane of conveyance, in a direction of conveyance DC, through the furnace 12. As a more detailed example, the heating elements may include radiant heating elements, such as electric heaters, and/or convective heating elements, such as hot gas or hot air distributors. The conveyor system 20 may be a roller conveyor type including rollers 22 and a drive system for rotating the rollers 22. Examples of such a conveyor system are disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al., which are hereby incorporated by reference.

The bending station 14 may have a conveyor or conveyor system 24, which may be a separate conveyor system or part of the conveyor system 20, for receiving a heated glass sheet G; and an insulated housing 26 defining a heated chamber 28 (e.g., heated to a temperature in the range of 610 to 725 degrees centigrade (° C.), or at least 600° C.) in which a portion of the mold apparatus 18 is located. Furthermore, the rollers 22 of the conveyor system 24 may be contained within the housing 26, or one or both ends of each roller 22 may extend laterally beyond side walls of the housing 26.

Referring to FIG. 2, the mold apparatus 18 may include a shuttle device 30 for transporting glass sheets G from the conveyor system 24 to a press mold portion 32 of the mold apparatus 18 where press forming of glass sheets G is performed. The shuttle device 30 may be an upper mold, for example, that is configured to receive a glass sheet G that is lifted off of the conveyor system 24 by a gas jet lift device 34 having a plurality of gas jet outlets 36 that supply upwardly directed gas streams 38 (e.g., heated air jet streams). The shuttle device 30 may also have multiple vacuum holes 39 that are connected to a source of vacuum to facilitate lifting of a glass sheet G and holding of the glass sheet G against the shuttle device 30. Furthermore, the shuttle device 30 may be configured to move laterally in a shuttle direction SD (i.e., in a direction transverse to the direction of conveyance DC) in order to move a particular glass sheet G from the conveyor system 24 to the press mold portion 32. In the embodiment shown in FIG. 2, for example, the shuttle device 30 has a frame 40 that is supported by elongated beams 42 (only one shown) that are movable by an actuator 43 through a connection 44. These beams 42 are supported by associated rollers 46 that are mounted by actuators 48 to provide vertical movement of the beams and hence vertical movement of the shuttle device 30 during its operation. More specifically, the shuttle device 30 can be moved downwardly to about one half inch (12 to 15 mm) from the conveyor system 24 for initial pickup of a glass sheet G, and can then be moved upwardly so as to move above drive mechanism covers 50 located at the ends of conveyor rollers 22. Lateral rollers 52 may also contact the beams 42 to provide lateral positioning (e.g., in directions parallel to the direction of conveyance DC) during movement of the shuttle device 30 between its pickup position and a delivery position at the press mold portion 32.

Figure 3:
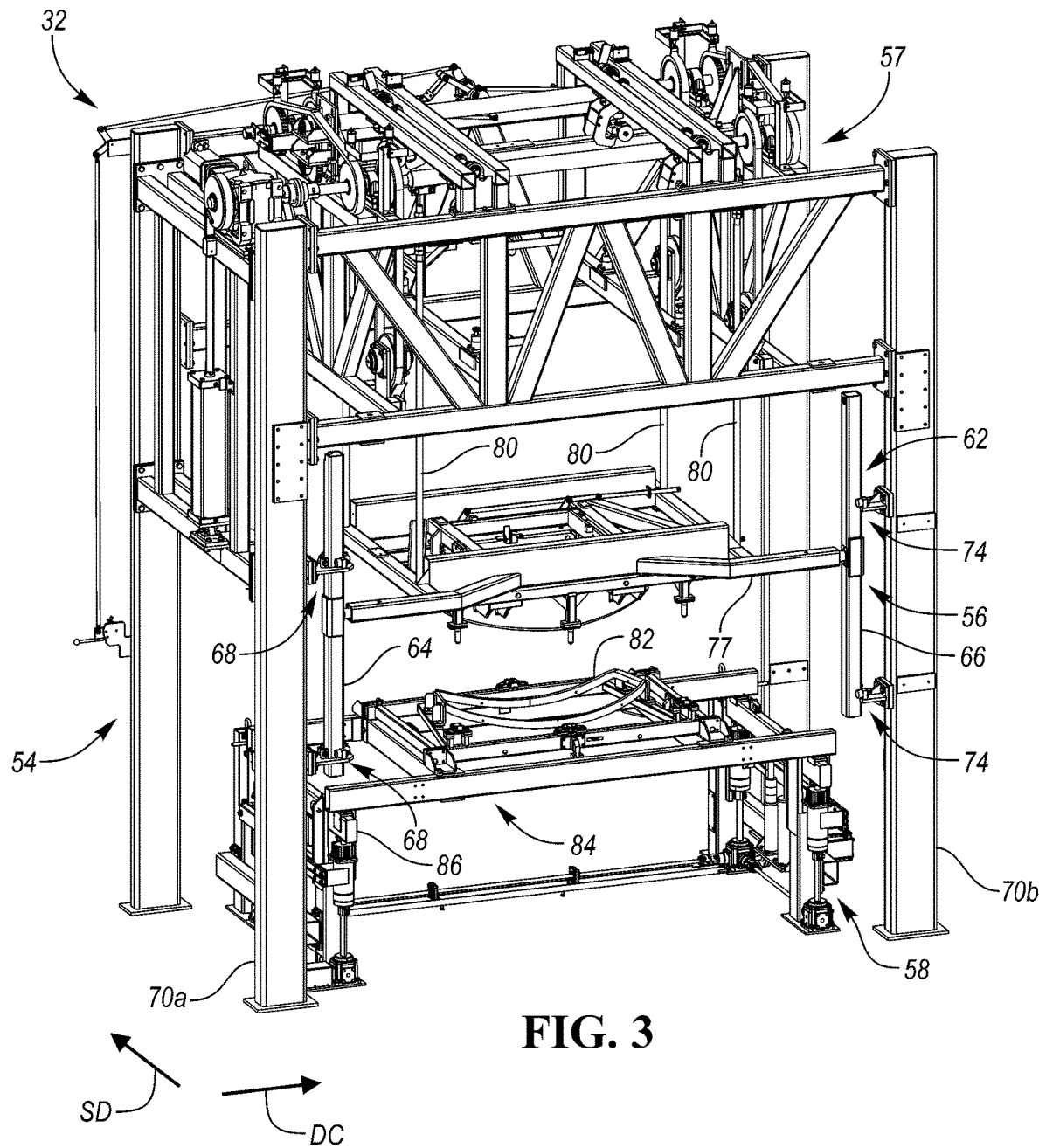
FIG. 3 is a perspective view of the press mold portion with the housing removed, wherein the press mold portion includes an upper mold arrangement and a lower mold arrangement.

Referring to FIGS. 2 and 3, the press mold portion 32 includes a main frame structure 54, a first mold arrangement, such as an upper mold arrangement 56, supported by the main frame structure 54, and a drive arrangement 57 for moving the upper mold arrangement 56 relative to the main frame structure 54. The press mold portion 32 further includes a second mold arrangement, such as a lower mold arrangement 58, supported independently of the main frame structure 54.

Referring to FIGS. 3-6, the upper mold arrangement 56 includes a vertically movable upper mold 60, and a guide frame 62 connected to the upper mold 60. The guide frame 62 includes first and second laterally spaced apart guide members, such as elongated first and second guide posts 64 and 66, respectively, that are vertically movable with the upper mold 60 and with respect to the main frame structure 54. Furthermore, the guide posts 64 and 66 may be at least partially located inside of the heated chamber 28 of the bending station 14. For example, a portion of each guide post 64 and 66 may be partially enclosed within an insulated case or box 67 (shown in phantom lines in FIGS. 5, 7 and 8) that is attached to the housing 26 of the bending station 14 and that is open to an interior of the housing 26, such that each insulated box 67 defines an extension of the heated chamber 28. Furthermore, each guide post 64 and 66 may movably protrude through sealed top and bottom portions of the respective insulated box 67. In addition, each guide post 64 and 66 may be cooled (e.g., cooled by a fluid, such as water, that is routed through an interior and/or along an exterior of each guide post 64 and 66) to control bending or distortion of the guide posts 64 and 66 during use.

The first guide post 64 is vertically guidable by the main frame structure 54 such that the first guide post 64 is inhibited or prevented from moving laterally (i.e., horizontally) in any direction when a portion of the upper mold arrangement 56 including the upper mold 60 is subjected to heat (e.g., in the heated chamber 28), such as heated air having a temperature in the range of 610 to 725° C., or at least 600° C. For example, the main frame structure 54 may include one or more first bearing assemblies 68 mounted on a first vertical support leg 70a, which is located outside of the heated chamber 28, and each first bearing assembly 68 may be configured to allow the first guide post 64 to move vertically while preventing lateral movement (i.e., horizontal movement) of the first guide post 64 in any direction. As a more detailed example, and referring to FIGS. 4-6, each first bearing assembly 68 may include four rollers 72 rotatably secured to the first vertical support leg 70a of the main frame structure 54, and each roller 72 may be arranged to engage a respective side of the first guide post 64 such that the rollers 72 engage two pairs of opposite sides of the first guide post.

Figure 5:
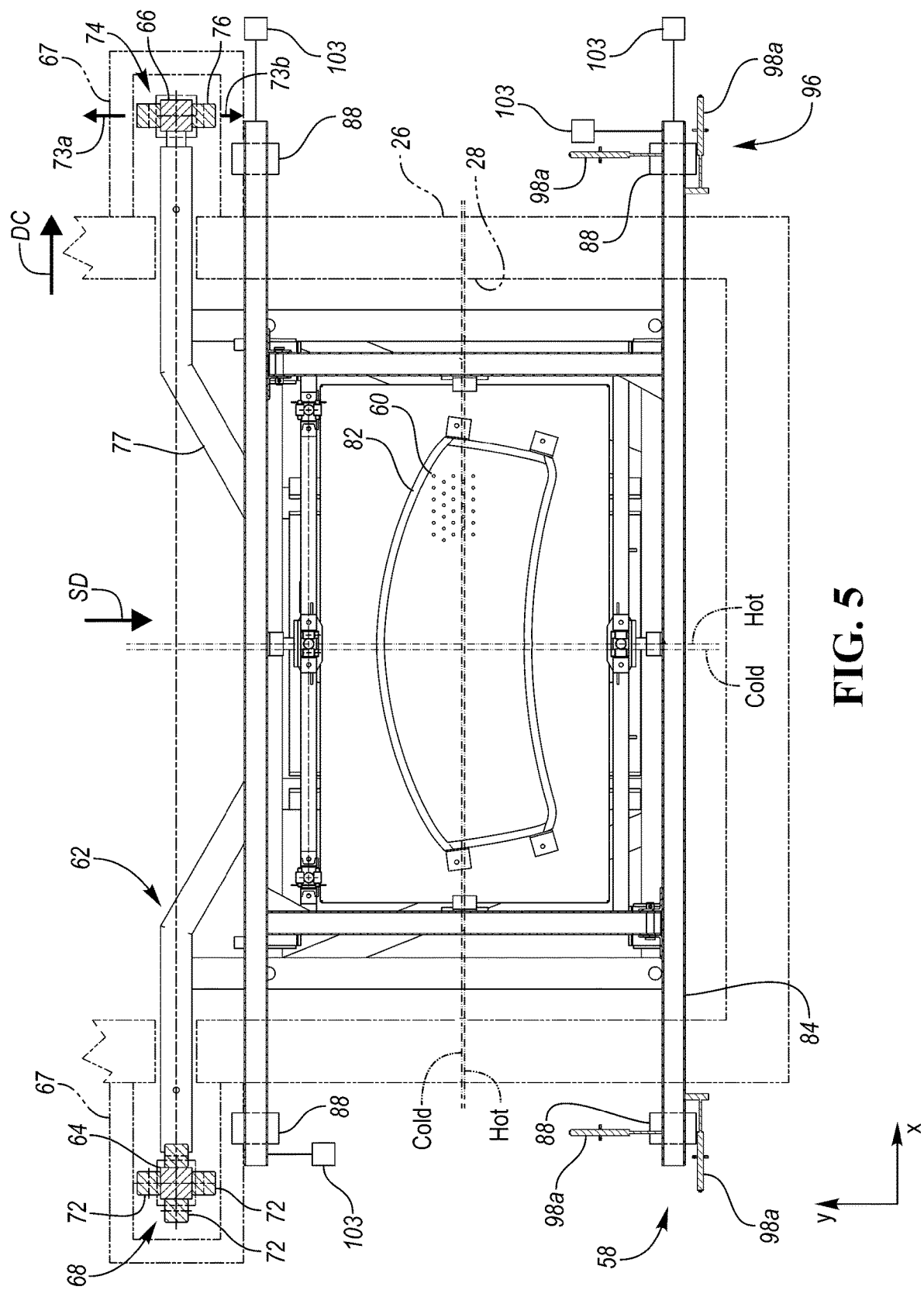
FIG. 5 is a bottom view of the press mold portion taken along line 5-5 of FIG. 4, and rotated 90 degrees.
Figure 6:
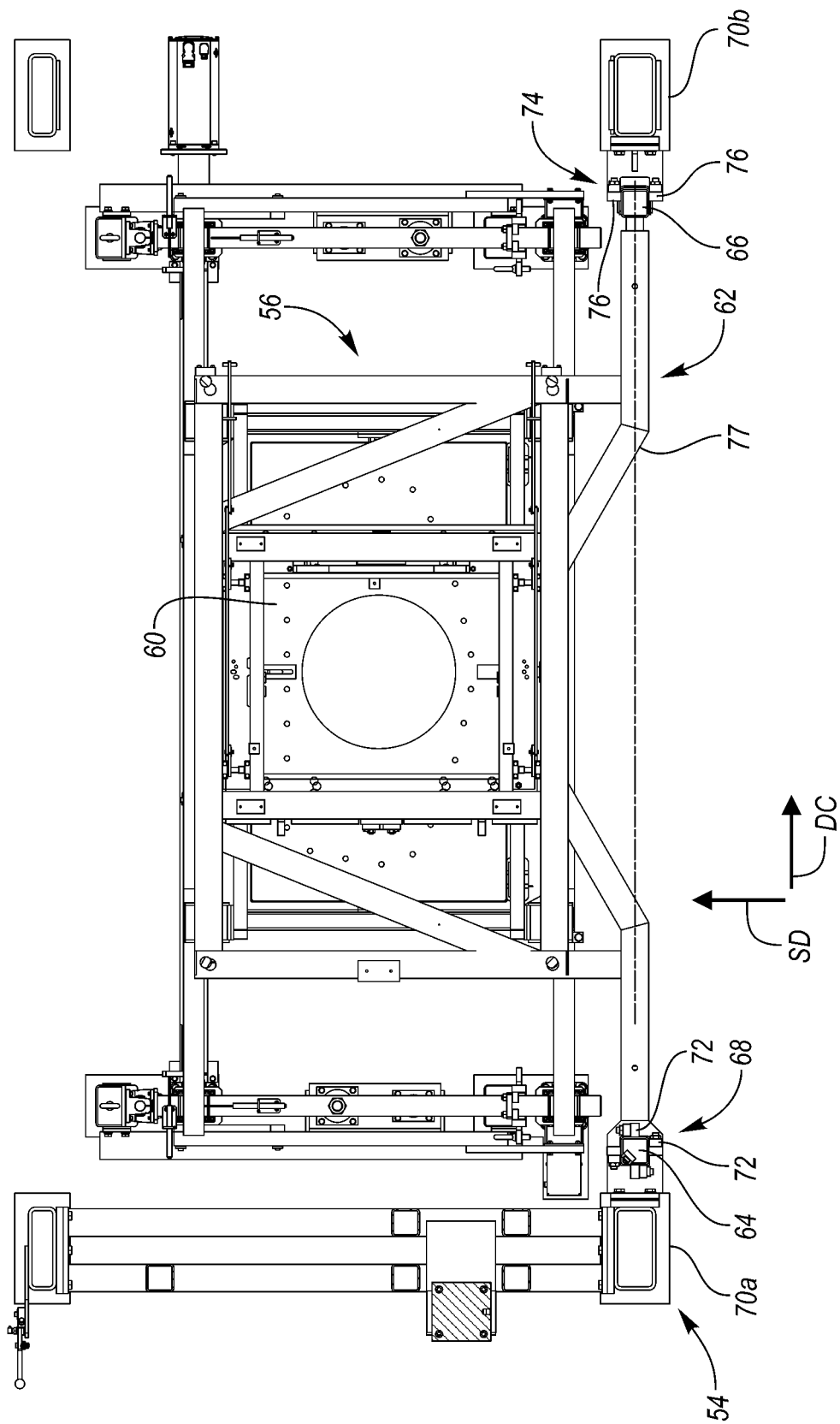
FIG. 6 is a cross-sectional view of the press mold portion showing a top view of the upper mold arrangement.

Referring to FIGS. 3, 5 and 6, the second guide post 66 is vertically guidable by the main frame structure 54 such that the second guide post 66 is movable laterally away from the first guide post 64 when the portion of the upper mold arrangement 56 is subjected to heat (i.e., due to thermal expansion of the upper mold arrangement 56). For example, the second guide post 66 may be vertically guidable by the main frame structure 54 such that the second guide post 66 is inhibited or prevented from moving laterally in two opposite first directions 73a and 73b (shown in FIG. 5) when the portion of the upper mold arrangement 56 is subjected to heat, but allowed to move laterally in two other directions that are transverse to the two first directions 73a and 73b. In that regard, the main frame structure 54 may include one or more second bearing assemblies 74 mounted on a second vertical support leg 70b, which is located outside of the heated chamber 28, and each second bearing assembly 74 may be configured to allow the second guide post 66 to move vertically while preventing lateral movement (i.e., horizontal movement) of the second guide post 66 in the two first directions 73a and 73b. As a more detailed example, and referring to FIGS. 5 and 6, each second bearing assembly 74 may include two rollers 76 rotatably secured to the second vertical support leg 70b of the main frame structure 54, and the rollers 76 may be arranged to engage opposite sides of the second guide post 66 such that the second guide post is prevented from moving in the two first directions 73a and 73b, but allowed to move laterally toward or away from first guide post 64 and the first vertical support leg 70a (e.g., in directions parallel to the direction of conveyance DC of glass sheets G along the conveyor systems 20 and 24).

Figure 7:
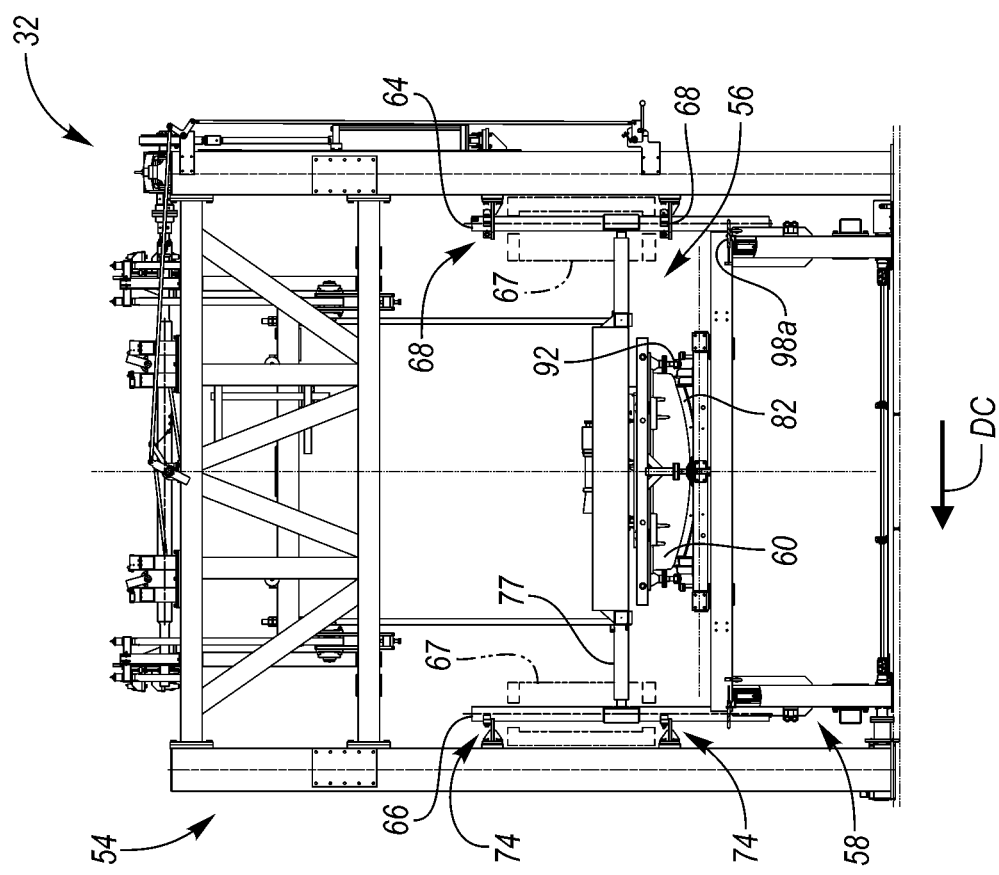
FIG. 7 is a side view of the press mold portion, viewed from left to right in FIG. 4, showing the upper mold arrangement in a raised position.
Figure 8:
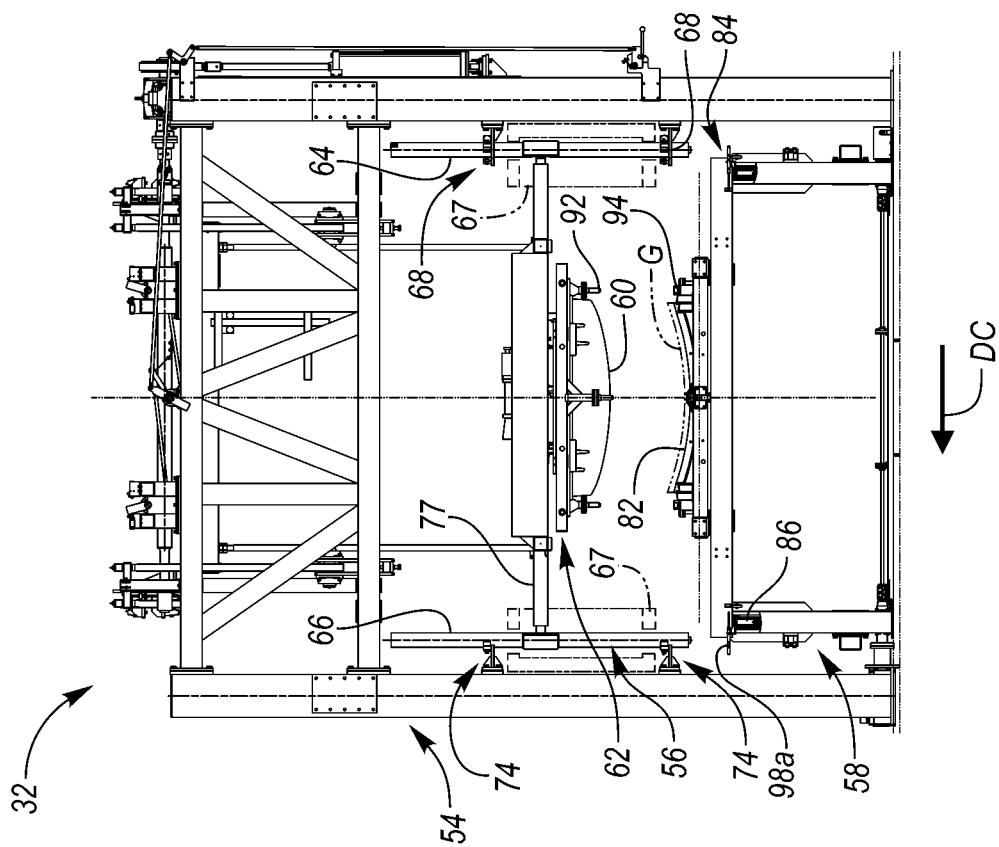
FIG. 8 is a side view of the press mold portion similar to FIG. 7, but showing the mold arrangements mated together for performing a press forming operation.

The rollers 72, 76 of each bearing assembly 68, 74 may be made of any suitable material, such as a suitable metal (e.g., stainless steel, brass alloy, etc.). Furthermore, the bearing assemblies 68 and 74 may all be located outside of the heated chamber 28. Referring to FIGS. 7 and 8, for example, each bearing assembly 68, 74 may be located above or below a respective insulated box 67 that receives a respective guide post 64, 66.

The guide frame 62 of the upper mold arrangement 56 may also include a laterally extending portion 77 that extends between the guide posts 64 and 66 and that is connected to the upper mold 60. Furthermore, the portion 77 may be fixedly or movably connected to the guide posts 64 and 66. In addition, the portion 77 may be a central portion of the guide frame 62, and the first and second guide posts 64 and 66 may respectively form first and second end portions of the guide frame 62.

Figure 4:
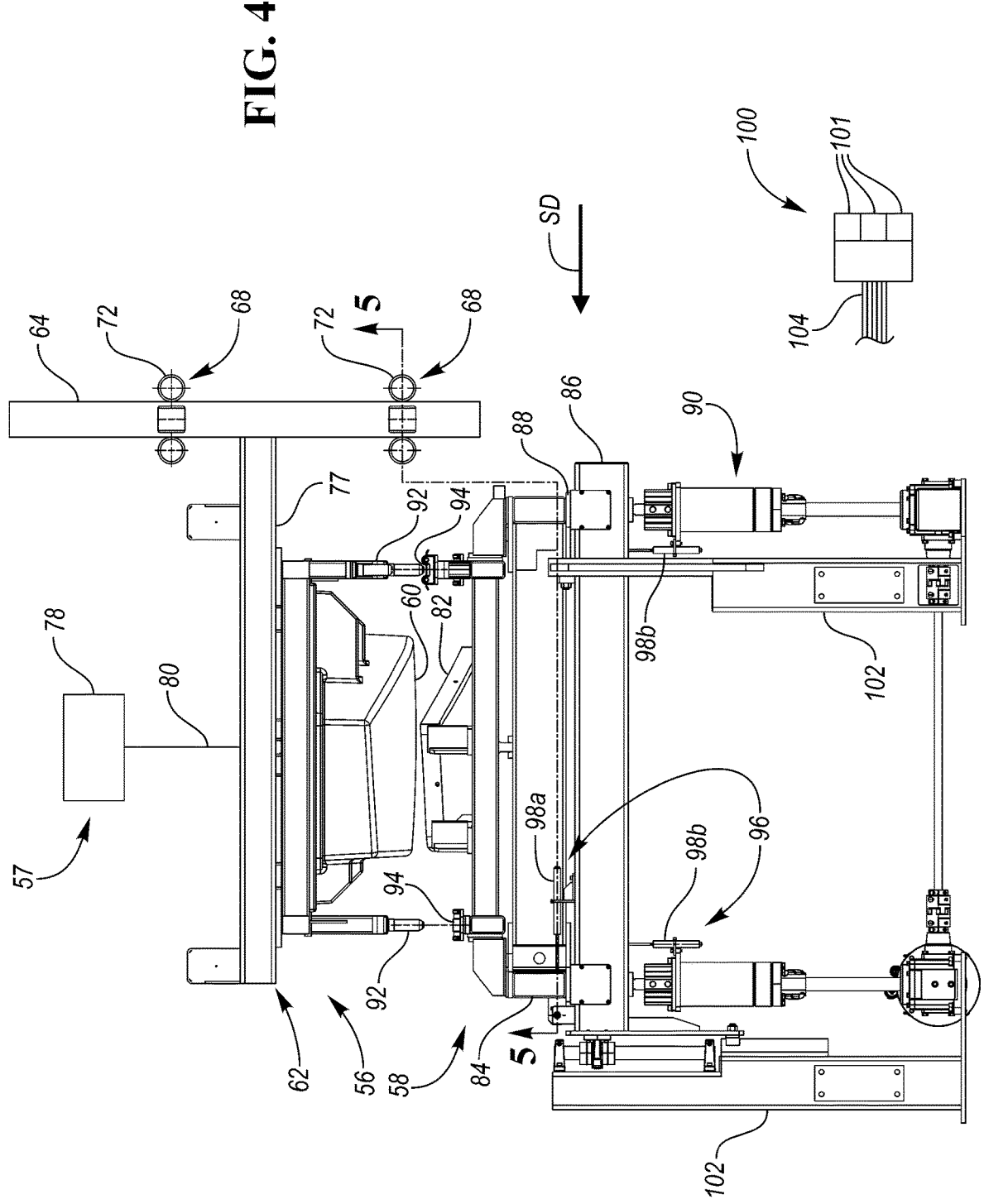
FIG. 4 is an upstream end view of the press mold portion.

Referring to FIGS. 3 and 4, the drive arrangement 57 for moving the upper mold arrangement 56 may be any suitable drive arrangement. For example, the drive arrangement 57 may include a mold lift actuator 78, such as an electric motor, connected to the upper mold 60 and/or the guide frame 62 with any suitable connections 80. The drive arrangement 57 may be configured to move the upper mold 60 and guide frame 62 vertically with respect to the main frame structure 54, such that the upper mold arrangement 56 is movable between a raised position, shown in FIG. 7, and a lowered position, shown in FIG. 8, in which the upper mold 60 mates with the lower mold arrangement 58.

Referring to FIG. 4, the lower mold arrangement 58 includes a lower mold 82, such as a press ring, a frame 84 connected to the lower mold 82, and a support frame 86 that supports the frame 84 such that the lower mold 82 and frame 84 are movable laterally with respect to the support frame 86. For example, one or more bearings may be positioned between the frame 84 and the support frame 86. As a more specific example, the frame 84 may include one or more bearings, such as bearing pads 88 shown in FIG. 5, that are slidably engageable with the support frame 86. As shown in FIG. 5, the bearing pads 88 are located outside of the heated chamber 28, while the lower mold 82 is located in the heated chamber 28.

Returning to FIG. 4, the support frame 86 may be supported by one or more actuators 90, such as screw jacks, that are configured to enable vertical movement of the support frame 86, frame 84 and lower mold 82. This vertical movement can be downward to allow the shuttle device 30 to move over the lower mold 82 and then upward to facilitate release of the glass sheet from the shuttle device 30 to the lower mold 82. In addition, the vertical movement of the lower mold 82 can also be used in cooperation with downward vertical movement of the upper mold 60 to perform press bending of the glass sheet G between the molds 60 and 82.

Referring to FIGS. 4 and 7, one or both mold arrangements 56 and 58 may include one or more alignment features to ensure proper alignment of the upper and lower molds 60 and 82, respectively, when the molds are 60 and 82 are mated together to perform a press forming operation on a glass sheet G. For example, one of the mold arrangements 56 or 58 may include one or more alignment pins 92 that are each engageable with an alignment receptacle 94 of the other mold arrangement 56 or 58. In the embodiment shown in FIGS. 4, 7 and 8, for example, the upper mold arrangement 56 includes multiple alignment pins 92 mounted on a lower portion of the guide frame 62, and each alignment pin 92 is insertable into an alignment receptacle 94 formed on or mounted to an upper portion of the frame 84 of the lower mold arrangement 58 when the molds are mated together for press forming a glass sheet G. Furthermore, each alignment pin 92 may have a tapered insertion end, and each receptacle 94 may have a rounded insertion edge (e.g., formed by one or more rollers) to facilitate engagement of the alignment features. In addition, because the lower mold 82 is laterally movable with respect to the support frame 86, the above alignment features may cause the lower mold 82 to move into alignment with the upper mold 60 if the lower mold 82 is misaligned a relatively minor amount (e.g., 0.375 inches or less) with respect to the upper mold 60 due to thermal expansion, for example.

Referring to FIGS. 4 and 5, the press mold portion 32 further includes a sensing system 96 for sensing position of one of the molds 60 or 82 relative to another component or ground, in order to determine if the one mold is in a suitable position for sufficiently mating with the other mold. The sensing system 96 may include one or more sensors 98 mounted to one of the mold arrangements 56 or 58 for determining horizontal position of one of the molds 60 or 82. For example, the sensing system 96 may include four lateral or horizontal position sensors 98a mounted on the support frame 86, and configured to sense lateral position of the frame 84 and lower mold 82. While the sensors 98a may be any suitable sensors, such as potentiometers, optical sensors, inductive proximity sensors and/or radar sensors, each sensor 98a is a linear variable differential transformer in the embodiment shown in FIGS. 4 and 5. Furthermore, each sensor 98a has a sensing end engaged with the frame 84.

The sensing system 96 may further include one or more vertical position sensors 98b for sensing vertical position of one of the molds 60 or 82. Referring to FIG. 4, for example, the sensing system 96 may include four vertical position sensors 98b that are each mounted to a respective actuator 90 and configured to sense vertical position of at least a portion of the support frame 86, frame 84 and lower mold 82. While the sensors 98b may be any suitable sensors, such as potentiometers, optical sensors, inductive proximity sensors and/or radar sensors, each sensor 98b is a linear variable differential transformer in the embodiment shown in FIG. 4. Furthermore, each sensor 98b has a sensing end engaged with the support frame 86.

In addition, the system 10 includes a control system 100, shown in FIGS. 1 and 4, including one or more controllers or control units 101 for determining position of one or both molds 60 and 82, and for controlling operation of the various above-described components. For example, the control system 100 may receive data or information from the sensors 98 and determine position of the lower mold 82 based on that information. As a more specific example, the control system 100 may use information from the horizontal position sensors 98a to determine horizontal position (e.g., in x and y directions) of the lower mold 82 relative to the support frame 86, which has outer support legs or portions 102 located outside of the heated chamber 28 and for which initial positions (e.g., at ambient temperature) may be input into the control system 100. The control system 100 may also determine position of the upper mold 60 in a similar manner, or by estimating position of the upper mold 60 based on such factors as a known initial position (e.g., at ambient temperature) of the upper mold 60 relative to the main frame structure 54, a known initial position of the main frame structure 54, temperature information associated with the heated chamber 28, time since initial startup of the system 10 for a particular production cycle, known or predicted expansion characteristics, and/or prior determined location information. For example, the control system 100 may estimate horizontal position of the upper mold 60 by estimating thermal expansion of the upper mold arrangement 56 due to elevated temperatures experienced in the heated chamber 28.

In one embodiment of the upper mold arrangement 56, and referring to FIG. 5, the upper mold 60 and guide frame 62 may be configured such that a center line of the upper mold 60 extending in the y direction (i.e., in a direction perpendicular to the direction of conveyance DC) may move about 0.75 inches in the direction of conveyance DC from a cold condition (e.g., ambient temperature) to a heated use condition (e.g., heated to a temperature in the range of 610 to 725° C.). Likewise, a center line of the upper mold 60 extending in the x direction (i.e, in a direction parallel to the direction of conveyance DC) may move about 0.375 inches in the direction SD perpendicular to the direction of conveyance DC from the cold condition to the heated use condition. Furthermore, with the configuration of the upper mold arrangement 56 described above, the angular orientation of the above centerlines may remain constant as the centerlines translate due to thermal expansion.

Based on the sensed position of the lower mold 82 and the estimated position of the upper mold 60, the control system 100 may then determine whether the lower mold 82 is in a suitable position for sufficiently mating with the upper mold 60. For example, the control system 100 may determine whether the alignment features 92 and 94 will engage when the molds 60 and 82 are brought together and/or whether a determined horizontal center of the lower mold 82 is within a suitable distance (e.g., at or below 0.375 inches) of an estimated center of the upper mold 60. If the control system 100 determines that the lower mold 82 is not in a suitable position for sufficiently mating with the upper mold 60, the control system 100 may be configured to provide a warning indication, such as a visual and/or audible alarm indicator (e.g., flashing light, alarm sound, warning message on a display screen, etc.). The lower mold 82 and frame 84 may then be laterally adjusted, manually or automatically, relative to the support frame 86 in order to put the lower mold 82 in a suitable position to sufficiently mate with the upper mold 60 when the molds are brought together. For example, the position of the lower mold 82 may be adjusted using a manual lever device or with one or more automatic horizontal actuators 103. As another example, operation of the system 10 may be halted until the control system 100 determines that the lower mold 82 is in a suitable position for sufficiently mating with the upper mold 60.

The control system 100 may also be configured to determine position of the upper mold 60 after the upper mold 60 has mated with the lower mold 82. For example, after any lateral adjustment of the lower mold 82 that may occur due to the alignment features 92 and 94 during mating of the molds 60 and 82, sensed position information for the lower mold 82 may be used to determine actual horizontal position of the upper mold 60. Operation of the shuttle device 30 and/or lift device 34 may then be adjusted to ensure that a glass sheet G to be brought over by the shuttle device 30 to the press mold portion 32 will be in a proper position for press forming. For example, activation of the lift device 34 may be accelerated or delayed (e.g., by 0.1 to 0.5 seconds) so that the glass sheet G is picked up by the shuttle device 30 at an earlier time or later time, as explained below in further detail.

The control system 100 may include a bundle of connections 104 for connecting with the various components of the system 10, such as the furnace 12, the conveyor system 20, the conveyor system 24, the mold apparatus 18 (e.g., the shuttle device 30 and the associated actuators, and the press mold portion 32 and the associated actuators and sensors), the cooling station 16, etc. Furthermore, the control system 100 may include any suitable hardware and/or software for controlling operation of the above components in order to perform the press forming of the glass sheet G, as well as its delivery and cooling (e.g., for performing the particular algorithms represented by the functions described herein). For example, the control system 100 may include one or more processors in communication with one or more storage devices or memory units, which include computer readable program instructions that are executable by the one or more processors so that the control system 100 may control operation of the conveyor system 20, the conveyor system 24, the mold apparatus 18, the cooling station 16, etc. The control system 100 may also, or instead, include one or more application specific integrated circuits, programmable gate arrays, programmable logic devices, and/or digital signal processors. In lieu of the connections 104, the control system 100 may instead be connected wirelessly to one or more of the above components.

Referring to FIGS. 1-8, a method of operating the system 10 will now be described in more detail. The method begins by heating a glass sheet G in the furnace 12 as the glass sheet G is conveyed in the furnace 12 along the plane of conveyance and in the direction of conveyance DC. Next, referring to FIG. 2, the glass sheet G may be transferred to the shuttle device 30 by lifting the glass sheet G off of the conveyor system 24 using the lift device 34 in conjunction with applying a vacuum at a surface of the shuttle device 30. As mentioned above, the shuttle device 30 may include an upper mold, such that bending of the glass sheet G may occur as the glass sheet G is urged against a mold surface of the shuttle device 30. The method continues by moving the shuttle device 30 laterally in the direction SD transverse to the direction of conveyance DC in order to transfer the glass sheet G to the press mold portion 32, and more particularly to a position between the upper and lower molds 60 and 82, respectively. The glass sheet G is then released from the shuttle device 30 and onto the lower mold 82, where gravity sagging of the glass sheet G may occur. Next, the molds 60 and 82 are brought together, such as by moving the upper mold 60 downward and/or moving the lower mold 82 upward, to press form the glass sheet G therebetween.

After the press forming, the upper mold 60 moves upwardly with the glass sheet G supported against its downwardly facing surface by a drawn vacuum (e.g., provided by a vacuum source), and the glass sheet G may then be cooled in a quenching or annealing operation at the cooling station 16. For example, referring to FIG. 2, a delivery mold 106 may be moved by an actuator 108 from the cooling station 16 to a position beneath the upper mold 60, the glass sheet G may then be released onto the delivery mold 106 by releasing the vacuum at the upper mold 60, and the delivery mold 106 may be moved back out to the cooling station 16 between upper and lower cooling heads 110 and 112, respectively, for quenching or annealing.

With the configuration of the press mold portion 32 described above, the bending station 14 may readily address thermal expansion that may occur at the press mold portion 32, such as during startup of the system 10 (e.g., during the first 30 to 45 minutes of operation) or at any time thereafter. For example, because the guideposts 64 and 66 cooperate with the main frame structure 54 to allow controlled thermal expansion of the upper mold arrangement 56, and because horizontal position of the lower mold 82 may be accurately sensed, the system 10 may accurately determine mold positions and mate-ability of the molds. Furthermore, as mentioned above, the system 10 is configured to provide a warning indication when the molds 60 and 82 are not in proper positions to sufficiently mate, and allow at least one of the molds to be repositioned, if desired. Therefore, if the control system 100 determines that the molds 60 and 82 will not sufficiently mate, operation of the system 10 may further include adjusting one of the molds (e.g., the lower mold) laterally so that the one mold will sufficiently mate with the other mold, and/or providing an indication that the molds will not sufficiently mate.

The mold arrangements 56 and 58 may be made of any suitable material, such as a material that provides consistent thermal expansion. For example, the molds 60 and 82 and the associated frames may each be made of a suitable metal such as stainless steel, e.g., austenitic stainless steel.

With the system configuration described above, and referring to FIGS. 1, 3 and 5, the first guide post 64 of the upper mold arrangement 56 is positioned at an upstream side of the molds 60 and 82 with respect to the direction of conveyance DC along the conveyor systems 20 and 24, and the second guide post 66 is positioned at a downstream side of the molds 60 and 82. Furthermore, because the first guide post 64 is inhibited or prevented from moving laterally in any direction by the main frame structure 54 (e.g., the first guide post 64 is laterally fixed), and the second guide post 66 is allowed to move only in directions parallel to the direction of conveyance DC, movement of the upper mold 60 due to thermal expansion will occur in directions away from the first guide post 64. Therefore, if the shuttle device 30 is not configured to be moved in the direction of conveyance DC, or it is not desired to do so, it may be desirable to adjust the longitudinal pickup position (i.e., the pickup position in the direction of conveyance DC) of a particular glass sheet G on the shuttle device 30 so that the glass sheet G will be in the proper position for press forming when the glass sheet G is moved laterally by the shuttle device 30, in the direction SD transverse to the direction of conveyance DC, to a position between the molds 60 and 82. For example, if the control system 100 determines that the upper mold 60 has moved beyond a predetermined distance (e.g., 0.75 inches) in the direction of conveyance DC, activation of the lift device 34 and/or the vacuum at the surface of the shuttle device 30 may be delayed (e.g., by 0.1 to 0.5 seconds) so that the glass sheet G will move slightly more in the direction of conveyance DC (e.g., 0.25 inches or less) before being picked up by the shuttle device 30, as compared to a typical design pickup location for the glass sheet G.

As another example, if the control system 100 determines that the upper mold 60 has moved less than a predetermined distance (e.g., 0.75 inches) in the direction of conveyance DC, activation of the lift device 34 and/or the vacuum at the surface of the shuttle device 30 may be accelerated (e.g., activation may occur sooner than usual or design intended) so that the glass sheet G will move slightly less (e.g., 0.25 inches or less) in the direction of conveyance DC before being picked up by the shuttle device 30, as compared to the typical design pickup location for the glass sheet G.

In another embodiment according to the present disclosure, the first guide post 64 may be positioned at the downstream side of the molds 60 and 82 with respect to the direction of conveyance DC, and the second guide post 66 may be positioned at the upstream side of the molds 60 and 82. With such a configuration, movement of the upper mold 60 due to thermal expansion may occur in a direction opposite the direction of conveyance DC.

In any case, the control system 100 may continuously or periodically determine position of the upper mold 60 as explained above, and adjust operation of the shuttle device 30 and/or lift device 34 as needed to ensure that each glass sheet G is provided to the press mold portion 32 in the proper position for press forming. As a result, system yield can be maximized.

Additional details of a shuttle device and other components that may be used with the mold apparatus 18 are disclosed in U.S. Pat. No. 9,452,948, which is hereby incorporated by reference in its entirety. Furthermore, the mold apparatus according to the present disclosure may be used in any suitable glass processing system.

While exemplary embodiments are described above, it is not intended that these embodiments describe all possible forms of the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A mold apparatus for bending a glass sheet, the mold apparatus comprising:
   a main frame structure;
   a first mold arrangement supported by the main frame structure, the first mold arrangement including a first mold and a guide frame connected to the first mold, the guide frame including first and second guide members that are vertically movable with respect to the main frame structure, the first guide member being guidable by the main frame structure such that the first guide member is inhibited from moving laterally in any direction when a portion of the first mold arrangement including the first mold is subjected to heat, and the second guide member being guidable by the main frame structure such that the second guide member may move laterally away from the first guide member due to thermal expansion of the first mold arrangement;

a second mold arrangement including a second mold and a support frame that supports the second mold such that the second mold is movable laterally with respect to the support frame; and at least one sensor for sensing position of one of the molds in order to determine whether the one mold is in a suitable position for mating with the other mold;

wherein the second mold is adjustable laterally to mate with the first mold in order to account for thermal expansion that may occur during use.

2. The mold apparatus of claim 1 wherein the second guide member is guidable by the main frame structure such that the second guide member is inhibited from moving laterally in two opposite directions when the portion of the first mold arrangement is subjected to heat.

3. The mold apparatus of claim 1 wherein the at least one sensor comprises a linear variable differential transformer.

4. The mold apparatus of claim 1 wherein the second mold arrangement comprises a movable frame fixedly connected to the second mold and movably supported on the support frame at four locations, and the at least one sensor comprises four sensors, and wherein two of the sensors are associated with one of the locations, and the other two sensors are associated with another one of the locations.

5. The mold apparatus of claim 4 wherein each sensor comprises a linear variable differential transformer.

6. The mold apparatus of claim 1 wherein the first mold is an upper mold and the second mold is a lower mold, and wherein the upper mold is movable vertically to mate with the lower mold.

7. The mold apparatus of claim 6 wherein the lower mold is a press ring.

8. The mold apparatus of claim 1 wherein the first guide member is connected to the main frame structure at one or more first connection locations, and each first connection location comprises four rotatable members for inhibiting lateral movement of the first guide member.

9. The mold apparatus of claim 8 wherein the second guide member is connected to the main frame structure at one or more second connection locations, and each second connection location comprises two rotatable members for inhibiting lateral movement of the second guide member in two opposite directions.

10. The mold apparatus of claim 1 wherein the first guide member forms a first end portion of the first mold arrangement.

11. The mold apparatus of claim 1 further comprising a laterally movable shuttle device for picking up the glass sheet from a conveyor and transporting the glass sheet to a location between the first and second molds, and wherein a pick-up position of the glass sheet from the conveyor onto the shuttle device is adjustable based on position of at least one of the molds.

12. The mold apparatus of claim 11 wherein the shuttle device comprises an upper mold.

13. A mold apparatus for molding a glass sheet, the mold apparatus comprising:

a main frame structure;

an upper mold arrangement supported by the main frame structure, the upper mold arrangement including a vertically movable upper mold and a guide frame connected to the upper mold, the guide frame including first and second elongated guide posts that are vertically movable with respect to the main frame structure, the first guide post being guidable by the main frame structure such that the first guide post is inhibited from moving laterally in any direction when a portion of the upper mold arrangement including the upper mold is subjected to heat, and the second guide post being guidable by the main frame structure such that the second guide post is inhibited from moving laterally in two opposite directions when the portion of the upper mold arrangement is subjected to heat and such that the second guide post may move laterally away from the first guide post due to thermal expansion of the upper mold arrangement;

a lower mold arrangement including a lower mold and a support frame that supports the lower mold such that the lower mold is movable laterally with respect to the support frame; and at least one sensor for sensing position of the lower mold in order to determine whether the lower mold is in a suitable position for sufficiently mating with the upper mold;

wherein, if determined that the molds will not sufficiently mate based on the sensed position of the lower mold, the lower mold is adjustable laterally with respect to the support frame to sufficiently mate with the upper mold in order to account for thermal expansion that may occur during use.

14. The mold apparatus of claim 13 further comprising a laterally movable shuttle device for picking up the glass sheet from a conveyor and transporting the glass sheet to a location between the upper and lower molds, and wherein a pick-up position of the glass sheet from the conveyor onto the shuttle device is adjustable based on position of at least one of the molds.

15. The mold apparatus of claim 14 further comprising a controller configured to determine position of the upper mold after the upper mold has mated with the lower mold, and to adjust the pick-up position of the glass sheet from the conveyor onto the shuttle device based on the position of the upper mold.

16. The mold apparatus of claim 13 further comprising a housing and first and second insulated cases attached to the housing, wherein the housing and the insulated cases define a heated chamber in which the portion of the upper mold arrangement is positioned, and wherein the first and second guide posts are partially enclosed within the first and second insulated cases, respectively, such that the first guide post movably protrudes through top and bottom portions of the first insulated case and the second guide post movably protrudes through top and bottom portions of the second insulated case.

17. The mold apparatus of claim 13 further comprising a heated chamber in which the portion of the upper mold arrangement and the lower mold are positioned, wherein the lower mold arrangement further includes a frame connected to the lower mold and one or more bearings positioned between the frame and the support frame for enabling the frame and the lower mold to move laterally with respect to the support frame, and wherein the one or more bearings are positioned outside of the heated chamber.

18. A method of operating a mold apparatus for bending a glass sheet, wherein the mold apparatus includes a main frame structure, a first mold arrangement supported by the main frame structure and including a vertically movable first mold and a guide frame connected to the first mold, and a second mold arrangement including a second mold and a support frame that supports the second mold, the method comprising:

sensing position of one of the molds in order to determine whether the one mold is in a suitable position for sufficiently mating with the other mold when the molds are subjected to heat; and if determined that the molds will not sufficiently mate based on the sensed position of the one mold, adjusting the second mold laterally with respect to the support frame so that the second mold will sufficiently mate with the first mold, or providing an indication that the molds will not sufficiently mate;

wherein the guide frame of the first mold arrangement includes first and second guide members that are vertically movable with respect to the main frame structure, the first guide member is guidable by the main frame structure such that the first guide member is inhibited from moving laterally in any direction when a portion of the first mold arrangement including the first mold is subjected to heat, and the second guide member is guidable by the main frame structure such that the second guide member may move laterally away from the first guide member due to thermal expansion of the first mold arrangement.

19. The method of claim 18 wherein the second guide member is guidable by the main frame structure such that the second guide member is inhibited from moving laterally in two opposite directions when the portion of the first mold arrangement is subjected to heat.

20. The method of claim 18 wherein the mold apparatus further comprises a laterally movable shuttle device for picking up the glass sheet from a conveyor and transporting the glass sheet to a location between the first and second molds, and wherein the method further comprises adjusting a pick-up position of the glass sheet from the conveyor onto the shuttle device based on position of at least one of the molds.

21. The method of claim 20 wherein the shuttle device comprises an upper mold.

22. The method of claim 20 wherein the first mold is an upper mold and the second mold is a lower mold, and sensing position of one of the molds comprises sensing position of the lower mold, wherein the method further comprises determining position of the upper mold after the upper mold has mated with the lower mold, and wherein adjusting the pick-up position of the glass sheet is based on the determined position of the upper mold.

23. A method of operating a mold apparatus for bending a glass sheet, wherein the mold apparatus includes a main frame structure, a first mold arrangement supported by the main frame structure and including a vertically movable first mold and a guide frame connected to the first mold, and a second mold arrangement including a second mold and a support frame that supports the second mold, the method comprising:

allowing lateral movement of the first mold due to thermal expansion of the first mold arrangement when a portion of the first mold arrangement is subjected to heat; and adjusting position of the second mold with respect to the support frame, prior to bringing the first and second molds together, so that the second mold will sufficiently mate with the first mold;

wherein the guide frame of the first mold arrangement includes first and second guide members that are vertically movable with respect to the main frame structure, the first guide member is guidable by the main frame structure such that the first guide member is inhibited from moving laterally in any direction when a portion of the first mold arrangement including the first mold is subjected to heat, and the second guide member is guidable by the main frame structure such that the second guide member may move laterally away from the first guide member due to thermal expansion of the first mold arrangement.

24. The method of claim 23 wherein the mold apparatus further comprises a housing and first and second insulated cases attached to the housing, wherein the housing and the insulated cases define a heated chamber in which the portion of the first mold arrangement is positioned, and wherein the first and second guide members are partially enclosed within the first and second insulated cases, respectively, such that the first guide member movably protrudes through top and bottom portions of the first insulated case and the second guide member movably protrudes through top and bottom portions of the second insulated case.

25. The method of claim 23 wherein the mold apparatus further comprises a heated chamber in which the portion of the first mold arrangement and the second mold of the second mold arrangement are positioned, wherein the second mold arrangement further includes a frame connected to the second mold and one or more bearings positioned between the frame and the support frame for enabling the frame and the second mold to move laterally with respect to the support frame, and wherein the one or more bearings are positioned outside of the heated chamber.

26. The method of claim 23 further comprising halting operation of the mold apparatus until a control system determines that the second mold is in a suitable position for sufficiently mating with the first mold.

* * * * *